(12) United States Patent
Bhogal et al.

(10) Patent No.: US 10,778,803 B2
(45) Date of Patent: Sep. 15, 2020

(54) SUB-SOCIAL NETWORK BASED ON CONTEXTUAL INFERENCING

(71) Applicant: International Business Machines Corporation, Armonk, NY (US)

(72) Inventors: Kulvir S. Bhogal, Fort Worth, TX (US); Nitin Gaur, Round Rock, TX (US); Chris D. Johnson, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 884 days.

(21) Appl. No.: 14/944,566

(22) Filed: Nov. 18, 2015

(65) Prior Publication Data
US 2017/0142221 A1 May 18, 2017

(51) Int. Cl.
*G06F 15/16* (2006.01)
*H04L 29/08* (2006.01)
*G06N 7/00* (2006.01)
*G06F 16/28* (2019.01)
*G06Q 50/00* (2012.01)

(52) U.S. Cl.
CPC .......... *H04L 67/306* (2013.01); *G06F 16/285* (2019.01); *G06N 7/005* (2013.01); *G06Q 50/01* (2013.01); *H04L 67/22* (2013.01); *H04L 67/327* (2013.01)

(58) Field of Classification Search
CPC .......... G06F 17/3089; G06F 17/30598; G06F 17/30029; G06F 17/30867; G06F 16/35; G06F 16/9535; G06Q 10/06; G06Q 10/10; G06Q 10/109; G06Q 20/32; G06Q 30/02; G06Q 30/0241; G06Q 50/01; G06Q 10/067; G06Q 30/0261; H04L 51/00; H04L 65/40; H04L 67/20
See application file for complete search history.

(56) References Cited

U.S. PATENT DOCUMENTS

| | | | | |
|---|---|---|---|---|
| 8,543,928 B2 * | 9/2013 | Stovicek | ................ | G06Q 10/10 379/201.12 |
| 8,601,055 B2 * | 12/2013 | Smith | ..................... | H04L 67/20 707/702 |
| 8,655,792 B1 * | 2/2014 | Gauvin | ............... | G06F 16/9535 705/319 |
| 8,856,131 B1 * | 10/2014 | Liu | ................... | G06F 17/30867 707/737 |
| 8,880,616 B2 | 11/2014 | Schuelke et al. | | |
| 9,654,425 B2 * | 5/2017 | Heiferman | .............. | H04L 51/00 |
| 2006/0143183 A1 * | 6/2006 | Goldberg | ............ | G06F 17/3089 |
| 2008/0275979 A1 * | 11/2008 | Saba | ....................... | G06Q 10/06 709/223 |

(Continued)

*Primary Examiner* — Dustin Nguyen
(74) *Attorney, Agent, or Firm* — Cuenot, Forsythe & Kim, LLC

(57) ABSTRACT

Creating sub-social networks based on contextual inferencing may include analyzing, using a processor, social network activity among a plurality of users that belong to a social network and determining, using the processor, an interest category according to the social network activity. A sub-social network for the interest category may be created using the processor. The sub-social network may include a subset of the plurality of users of the social network having an association with the interest category.

17 Claims, 4 Drawing Sheets

(56) References Cited

U.S. PATENT DOCUMENTS

| | | | |
|---|---|---|---|
| 2011/0004501 A1* | 1/2011 | Pradhan | G06Q 10/109 |
| | | | 705/319 |
| 2011/0029894 A1* | 2/2011 | Eckstein | G06Q 20/32 |
| | | | 715/753 |
| 2011/0153588 A1 | 6/2011 | Gartner et al. | |
| 2012/0197723 A1 | 8/2012 | Watfa et al. | |
| 2013/0124298 A1* | 5/2013 | Li | G06Q 30/0241 |
| | | | 705/14.42 |
| 2013/0159110 A1* | 6/2013 | Rajaram | G06Q 30/02 |
| | | | 705/14.66 |
| 2013/0232012 A1* | 9/2013 | Yan | G06Q 30/02 |
| | | | 705/14.67 |
| 2013/0282486 A1 | 10/2013 | Rahle et al. | |
| 2013/0290414 A1* | 10/2013 | Rait | G06Q 50/01 |
| | | | 709/204 |
| 2013/0304772 A1* | 11/2013 | Fay | G06Q 50/01 |
| | | | 707/821 |
| 2014/0006973 A1* | 1/2014 | Cattermole | H04L 65/40 |
| | | | 715/753 |
| 2014/0164300 A1* | 6/2014 | Mishra | G06Q 50/01 |
| | | | 706/38 |
| 2014/0351259 A1* | 11/2014 | Bilimoria | G06F 17/30598 |
| | | | 707/740 |
| 2015/0046458 A1* | 2/2015 | Hu | G06F 17/30029 |
| | | | 707/738 |
| 2015/0106192 A1 | 4/2015 | Guo et al. | |
| 2015/0172334 A1 | 6/2015 | Gomba et al. | |
| 2015/0294221 A1* | 10/2015 | Andres Gutierrez | |
| | | | G06Q 30/0261 |
| | | | 706/46 |
| 2015/0295875 A1* | 10/2015 | El Daher | G06F 16/35 |
| | | | 709/206 |
| 2017/0236081 A1* | 8/2017 | Grady Smith | G06Q 10/067 |
| | | | 705/7.36 |

* cited by examiner

SUB-SOCIAL NETWORK BASED ON CONTEXTUAL INFERENCING

BACKGROUND

This disclosure relates to social networks and, more particularly, to determining sub-social networks based on contextual inferencing. A social networking system refers to a computing platform that allows users to build social networks, e.g., social relations, among people who share similar interests, activities, backgrounds or real-life connections. Users may communicate with one another through the social networking system. In the typical case, a user joins a social networking system and begins to establish associations with other users. The group of users on the social networking system with whom a selected user has actively accepted within the group may be referred to as the "social network" of the selected user.

SUMMARY

An embodiment of the present invention may include a method. The method may include analyzing, using a processor, social network activity among a plurality of users that belong to a social network and determining, using the processor, an interest category according to the social network activity. A sub-social network for the interest category may be created using the processor. The sub-social network may include a subset of the plurality of users of the social network having an association with the interest category.

Another embodiment of the present invention may include a system having a processor programmed to initiate executable operations. The executable operations may include analyzing social network activity among a plurality of users that belong to a social network and determining an interest category according to the social network activity. A sub-social network for the interest category may be created. The sub-social network may include a subset of the plurality of users of the social network having an association with the interest category.

Another embodiment of the present invention may include a computer program including a computer readable storage medium having program code stored thereon. The program code is executable by a processor to perform a method. The method may include analyzing, using the processor, social network activity among a plurality of users that belong to a social network and determining, using the processor, an interest category according to the social network activity. A sub-social network for the interest category may be created using the processor. The sub-social network may include a subset of the plurality of users of the social network having an association with the interest category.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to social networks and, more particularly, to determining sub-social networks based on contextual inferencing. In accordance with the inventive arrangements described herein, sub-social networks for users may be determined based, at least in part, upon activity that is observed within the social networking system. The sub-social networks may be generated as subsets of the users that belong to a social network, or social networks, within the social networking system. In one aspect, the sub-social networks may be created dynamically, e.g., automatically by the social networking system. The sub-social networks may be created for one or more interest categories that may be determined from the observed activity occurring over the social networking system.

In another arrangement, the effectiveness of sub-social networks may be quantified. A sub-social network may be reevaluated and updated on a continuing basis responsive to the quantified effectiveness of that sub-social network. In one aspect, for example, content items may be automatically distributed to users of a sub-social network. The effectiveness of the sub-social network may be determined, at least in part, according to the interest expressed by users of the sub-social network in the content items that may be distributed therein. Further details are described with reference to the figures below.

Figure 1:
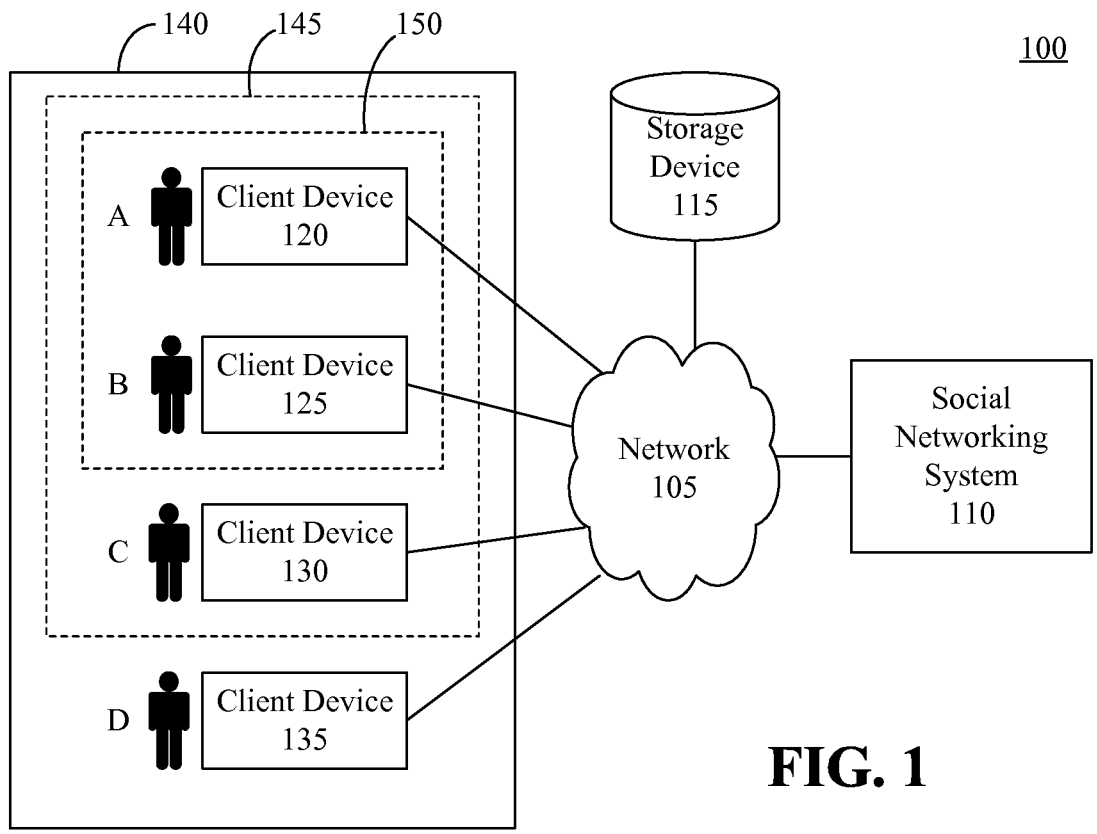
FIG. 1 is a block diagram illustrating an example of a network computing system.

FIG. 1 is a block diagram illustrating an example of a network computing system 100 in which the inventive arrangements may be implemented. Network computing system 100 contains a network 105. Network 105 is the medium used to provide communications links between various devices and data processing systems connected together within network computing system 100. Network 105 may include connections, such as wire, wireless communication links, or fiber optic cables. Network 105 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

In the depicted example, a social networking system 110 and a storage device 115 may couple to network 105. In addition, client devices (clients) 120, 125, 130, and 135 may couple to network 105. Social networking system 110 may be implemented as a data processing system (e.g., a server) or as one or more interconnected data processing systems executing suitable operational software to perform social networking operations as described herein and interact with clients 120, 125, 130, and 135.

As defined herein, a "social networking system" is a computing platform that allows users to build social networks, e.g., social relations, among people who share similar interests, activities, backgrounds or real-life connections. Social networking system 110 supports social network activities among users. As defined herein, "social network activities" are communications supported by a social networking system among users of the social networking system and/or operations that modify a social network.

Exemplary communication type social network activities may include, but are not limited to, posting messages, posting media items, commenting on posts, commenting on media items, replying to messages, "liking" a communication and/or media item, sharing a communication or media item with other users, and/or the like. Exemplary operation type social network activities may include the addition of a user to a particular social network and the removal of a user from a social network. Within social networking system 110, social network activities may have attributes such as the originator, the recipient, a type (e.g., post, share, like, added to social network, removed from social network, etc.), a timestamp (a date and/or time), and the like. Further, social network activities may be persisted within a data storage device of social networking system 110.

Clients 120, 125, 130, and 135 may be implemented as data processing systems. The data processing devices may execute suitable operational software. For example, clients 120, 125, 130, and/or 135 may execute an operating system and a social networking client application whether a browser or a specialized (e.g., dedicated) social networking client application. Examples of clients may include, but are not limited to, personal computers, portable devices, network computers, tablet computers, mobile phones, or the like. Clients 120, 125, 130, and 135 may communicate with one another through social networking system 110 and network 105.

As pictured, users A, B, C, and D may interact with social networking system 110 through clients 120, 125, 130, and 135, respectively. Social networking system 110 may have users A, B, C, and D organized into a social network 140. In one arrangement, social network 140 may represent all users of a particular organization, e.g., a business entity, an academic institution, or the like.

In another arrangement, social networking system 110 may also have users A, B, and C organized into a social network 145 that belongs to a particular user. In this example, user A may be considered a primary user of social network 145. The "primary user" of a social network may be considered the owner and, as such may define the perspective taken in terms of membership in a social network where other users are members of that primary user's social network. Referring again to FIG. 1, when user A is viewed as the primary user of social network 145, which includes users A, B, and C, users B and C may be said to be in the social network of user A.

In another arrangement, social networking system 110 may operate dynamically to determine and create further groups of users based upon a variety of factors to be described herein in greater detail. Social networking system 110 may form the further groups, referred to herein as "sub-social networks," to include subsets of users of social network 140 and/or social network 145. In the example of FIG. 1, social networking system 110 has automatically created a sub-social network 150 from users of social network 140 and/or users of social network 145. Sub-social network 150 includes user A and user B. Another example of a sub-social network may include user A and user C, excluding user B and user D.

It should be appreciated that in an actual social networking system, the number of users in the social networking system may be significantly more than illustrated in FIG. 1. As such, social networks, whether organization wide, for a primary user, may have more users than shown. Accordingly, the possible combinations of sub-social networks and number of users in such sub-social networks may be larger than illustrated in FIG. 1. In this regard, FIG. 1 is provided for purposes of illustration and is not intended to limit the inventive arrangements described herein. Network computing system 100 may include fewer elements than shown or more elements such as additional servers, clients, and other devices.

In one arrangement, social networking system 110 may manage content distribution using the sub-social networks. By creating and updating sub-social networks such as sub-social network 150, on an ongoing basis, social networking system 110 may limit unnecessary distribution of data through network 105. For example, social networking system 110 may receive a content item from user A through client 120. Rather than disseminating the content item to user B, user C, and user D of social network 140 and/or social network 145, social networking system 110 may determine a correlation between the content item and sub-social network 150.

In the case where social networking system 110 determines that the content item is correlated with sub-social network 150, social networking system 110 may automatically distribute the content item to user B. As such, social networking system 110 may proactively disseminate content items to those users most likely to consume the content item while also preventing other users, e.g., users C and D, that are not part of sub-social network 150 from receiving the content item. Social networking system 110 may prevent dissemination of the content items to users that are not part of sub-social network 150.

As an illustrative example, consider the case where user A uploads a large content item such as a movie. Social networking system 110 may determine that the movie is of interest to sub-social network 150 and not to users of social network 140 and not to users of social network 145. Since the content item is not disseminated to users C and D, social networking system 110 requires less bandwidth and may improve responsiveness. Further, social networking system 110 has proactively disseminated the content item according to the probability that users B, C, and D will consume the content item as opposed to simply making the content item available to the entirety of social network 140 or the entirety of social network 145 of user A.

Figure 2:
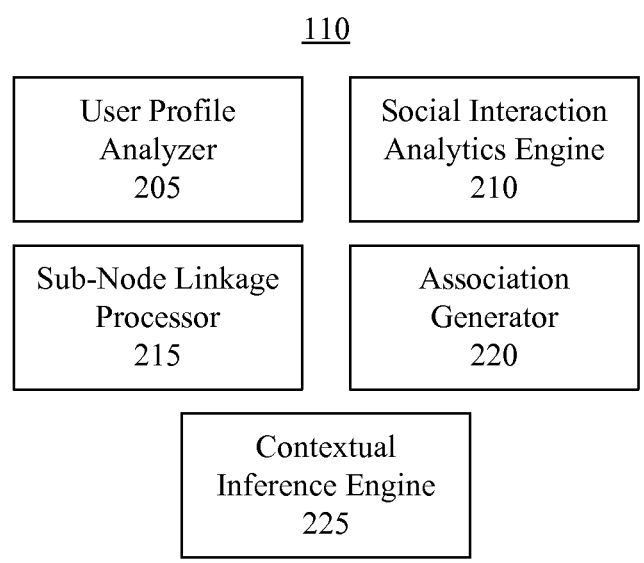
FIG. 2 is a block diagram illustrating an exemplary software architecture for a social networking system.

FIG. 2 is a block diagram illustrating an exemplary software architecture for social networking system 110 of FIG. 1. As pictured, social networking system 110 may include a user profile analyzer 205, a social interaction analytics engine 210, a sub-node linkage processor 215, an association generator 220, and a contextual inference engine 225.

User profile analyzer 205 may be configured to identify and extract common features across a plurality of user profiles. For example, given a plurality of users, such as users within a same social network, user profile analyzer 205 may determine those users having common age, demographics, education, etc., according to the user profiles. User profile analyzer 205 may also determine users that have manually subscribed to particular businesses, clubs, hobbies, and the like within social networking system 110 as may be specified within the user profiles.

In one aspect, what is considered a "common" feature may be programmed into user profile analyzer 205. For example, for one or more data items on user profiles, user profile analyzer 205 may require that the data items be exact matches to be considered "common." In other cases, user profile analyzer 205 may only require that the data items be within a predetermined range of values and/or a percentage or range of one another to be considered "common."

Social interaction analytics engine 210 may be configured to analyze events stored within historical data of social networking system 110. For example, social interaction analytics engine 210 may be configured to detect and analyze life events for users, detect and analyze geographical specific events, and the like that may be persisted by social networking system 110 as one or more social network activities. Examples of life events may include, but are not limited to, births, marriages, and the like. Social interaction analytics engine 210 further may detect the addition of a user to a social network (e.g., the creation of a new network node or sub-network node), the removal of a user from a social network (e.g., the deletion of a network node or a sub-network node), and/or the like.

Sub-node linkage processor 215 may be configured to analyze sub-node linkages based on information and content consumption. As generally known in the art, a social network may be represented in graph form where nodes represent users and edges coupling the nodes represent associations between users. The sub-node linkages represent the various interactions that may occur, e.g., social networking activity, between users of a social network. For example, sub-node linkage processor 215 may be configured to determine whether a user of a social network "likes" a particular content item, "shares" a particular content item, or the like. Sub-node linkage processor 215 may perform the sub-node linkage analysis, e.g., determine types of social networking activities, among users within a social network organization wide, within and/or across particular social networks of primary user, or the like.

In one illustrative example, a user that is a primary node may have multiple sub-social networks such as sports, demographic, region, festivals, activism, and the like. Sub-node linkage processor 215 may identify linkages, e.g., communications, between those sub-social networks (e.g., nodes of those sub-social network). For example, sub-node linkage processor 215 may identify a linkage between sports and region.

Association generator 220 may be configured to generate new and/or ad hoc associations for users of a social network. In one arrangement, association generator 220 may generate associations between users and one or more interest categories. Association generator 220 may generate the associations based upon common features determined by user profile analyzer 205, social networking activity among users of a social network determined by social interaction analytics engine 210, and/or sub-node linkages determined by sub-node linkage processor 215. In one arrangement, for each association, association generator 220 may determine a probability for the association indicating a likelihood that the user will have an interest, e.g., interact, for a given interest category.

Contextual inference engine 225 may be configured to use the probabilistic associations output from association generator 220 to create one or more sub-social networks. The sub-social network may be used for information distribution as described herein. In a further arrangement, contextual inference engine 225 may also determine effectiveness for the created sub-social networks. In one aspect, contextual inference engine 225 may determine an effectiveness score for one or more or each created sub-social network. In another aspect, the effectiveness scoring may be performed for individual users that are part of a particular sub-social network. Contextual inference engine 225 may use, or reuse, the effectiveness score to update the particular inferences drawn by contextual inference engine 225 and/or change sub-node linkages, which may add and/or remove users from particular sub-social networks.

The architecture described with reference to FIG. 2 is provided for purposes of illustration only. User profile analyzer 205, social interaction analytics engine 210, sub-node linkage processor 215, association generator 220, and contextual inference engine 225 may be implemented as executable program code stored in a memory of social networking system 110 and executed.

Figure 3:
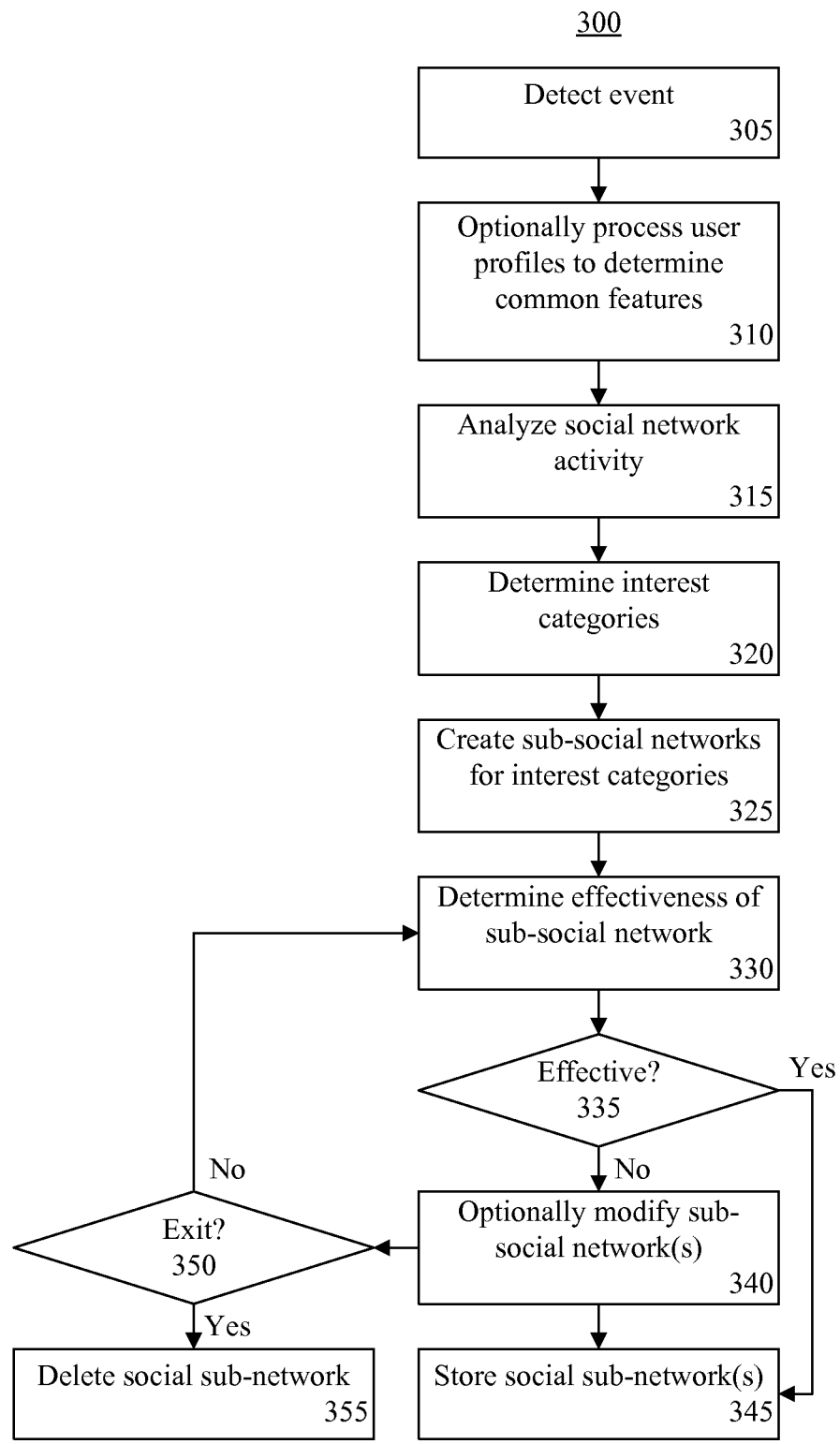
FIG. 3 is a flow chart illustrating an exemplary method of sub-social network determination.

FIG. 3 is a flow chart illustrating an exemplary method 300 of sub-social network determination. Method 300 may be performed by social networking system 110 as described with reference to FIG. 1 (hereafter "the system").

In block 305, the system may detect an event within a social network. In one aspect, the social network within which the event is detected may be for an entire organization or span multiple social networks of different users. In another aspect, the social network may be one of a primary user. The event that is detected may be may be a life event, the addition of a new user to the social network, the removal of a user from the social network, another type of event as may be detected by social interaction analytics engine 210, or the like. In one aspect, detection of the event may initiate the processing described with reference to FIG. 3.

In block 310, the system may optionally process user profiles of the users of the social network to determine common features.

In block 315, the system may analyze social network activity among users of the social network. In one embodiment, the social network activity includes events of the social network. In another embodiment, the social network activity includes the sub-node linkages of the social network. In still another embodiment, the social network activity includes both events and sub-node linkages of the social network.

For example, the system may perform Natural Language Processing on the social network activity among the users of the social network. Natural Language Processing (NLP) is a field of computer science, artificial intelligence, and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, the system may perform semantic analysis. Semantic analysis may follow parsing and involve extraction of context-independent aspects of the meaning of a sentence including, but not limited to, entities, named entities, semantic roles of entities, grammatical structures, and quantification information such as cardinality, iteration, and dependency.

In another aspect, the system may perform sentiment analysis. Sentiment analysis, also known as "opinion mining," refers to the use of technologies such as NLP, text analysis, and/or computational linguistics to determine and extract subjective information from an information source. In this example, the system may perform sentiment analysis on the social network activities to determine positive or negative feeling for the entities detected therein.

In block 320, the system may determine one or more interest categories. In one embodiment, the system may determine interest categories from the social network activity among users of the social network. As an illustrative example, the system may create an interest category for an entity and/or a named entity detected within social network activity between two or more users of the social network from block 315. In another embodiment, the system may determine one or more interest categories from social network activity among users of the social network and from the common features determined from the user profiles.

For example, the system may determine interest categories that may be combinations of factors from the user profiles, the events, and the sub-node linkages, etc. Consider the case where a subset of users of the social network are communicating about a sport such as soccer. The system may determine the sub-node linkages established among the users relating to soccer where social network activity of the users is may be analyzed to determine the content, e.g., soccer. The social networking system further may determine additional factors such as demographics for users that are communicating about soccer to further refine the interest category to include soccer and a particular demographic.

In block 325, the system may create sub-social networks for the interest categories determined in block 320. For example, the system may create one sub-social network for each interest category. In one embodiment, the system may create the sub-social network for the interest category by binding the interest category to each user of the social network to which the interest category pertains. For example, the system may bind the interest category to the users having social network activity in which the interest category was detected. In another example, the system may bind the interest category and the sentiment to each such user.

In another arrangement, the system may generate probabilistic associations of users to the various interest categories. For example, for a given interest category such as soccer, the system may determine a probabilistic association of each user in the social network with "soccer". The probabilistic association for a user for a particular interest category indicates the likelihood that the user is interested in the interest category. In one arrangement, the system may form a sub-social network for an interest category by including each user having a probabilistic association for the interest category that exceeds the threshold.

As noted, creation of sub-social networks according to the probabilistic associations may be performed with respect to a social network for an organization as a whole, e.g., across social networks of two or more primary users. In that case, a first user belonging to the social network of primary user A and a second user belonging to a social network of primary user B both may be included in a same sub-social network if the first and second user each have a probabilistic association for the interest category upon which the sub-social network is formed that exceeds a threshold value. In another arrangement, creation of sub-social networks may be restricted to creating a sub-social network that includes only the users belonging to the social network of a particular primary user. In that case, each user included in a sub-social network will have a direct connection with the primary user of the social network, whereas in the prior example, the first user may not be in the social network of primary user B; and, the second user may not be in the social network of primary user A.

In block 330, the system may determine effectiveness of the sub-social network(s) created in block 325. In block 335, the system may determine whether the sub-social network(s) are effective. If the sub-social network is not effective, method 300 may continue to block 340. If the sub-social network is effective, method 300 may continue to block 345 where the sub-social network may be stored for subsequent use.

In block 340, the system may optionally modify the sub-social network. In one aspect, the system may add and/or remove users from the sub-social network. In block 350, the system may determine whether to exit method 300. If so, method 300 may continue to block 355, where the sub-social network may be deleted. If not, method 300 may loop back to block 330 to continue processing. For example, after a particular amount of time and/or iterations, the system may exit method 300 and delete the sub-social network if still determined to be ineffective after continue attempts to modify and improve effectiveness.

It should be appreciated that method 300 may be performed responsive to various events as described. As such, the system may continually update and/or revise the social sub-networks that are generated.

Figure 4:
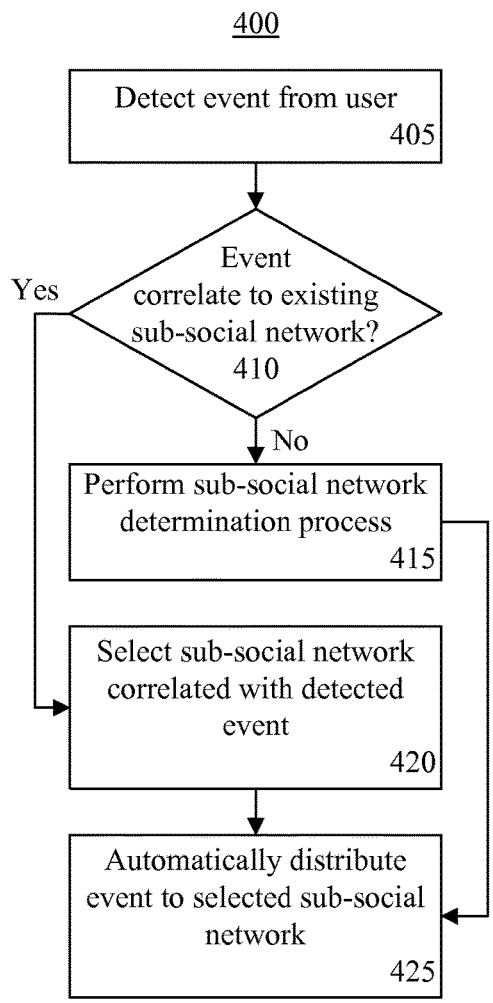
FIG. 4 is a flow chart illustrating an exemplary method of content distribution for a social networking system.

FIG. 4 is a flow chart illustrating an exemplary method 400 of content distribution for a social networking system. Method 400 may be performed by social networking system 110 as described with reference to FIG. 1 (hereafter "the system").

In block 405, the system may receive an event from a user. In one example, the event may be a content item. The content item may be a file such as a video file, audio file, or the like. In another example, the content item may be a social network activity such as a post, a comment, or the like.

In block 410, the system may determine whether the event is correlated with an existing sub-social network. If so, method 400 may continue to block 420. If not, method 400 may proceed to block 415. In one aspect, the system may determine whether the event is correlated with the social network of the primary user that generated the event. In another aspect, the system may determine whether the event is correlated with sub-social networks of a plurality of different users, e.g., not just restricted to the social network of the user that generated the event.

For example, in receiving the event, the system may semantically process a description of the event, a tag of the event, and/or semantically process the event itself in the case where the event includes searchable text. In the case where the event is a content item such as video, the system may be able to determine whether the video is sports related based upon any of a variety of features such as motion that may be extracted from the content item using digital image processing.

For purposes of illustration, consider an example where the primary user of a social network uploads a content item such as video with a textual description of "amazing goal." The system, in this example, may determine that the video is correlated to the sub-social network created for the interest category of "soccer." The "soccer" sub-social network within the social network of the primary user is determined to be correlated with the event. In another example, the event may be determined to be correlated to a "soccer" sub-social network that spans a plurality of different users' social networks.

Proceeding with block 415, the system may perform a sub-social network determination process as described with reference to FIG. 3. After block 415, the method 400 may continue to block 425.

In block 420, the system may select the sub-social network determined to be correlated with, or most highly correlated with, the event. In the case where the sub-social network is created, the created sub-social network may be considered the "selected sub-social network" for purposes of FIG. 4.

In block 425, the system may automatically distribute the event to the selected sub-social network. The system may distribute the event only to users belonging to the selected sub-social network.

Figure 5:
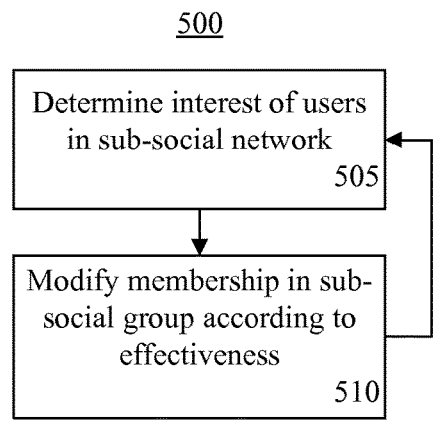
FIG. 5 is a flow chart illustrating an exemplary method of determining effectiveness for sub-social networks.

FIG. 5 is a flow chart illustrating an exemplary method 500 of determining effectiveness for sub-social networks. Method 500 may be performed by social networking system 110 of FIG. 1 (hereafter "the system"). In one example, method 500 maybe used to implement one or more of blocks 330, 335, 340, and/or 350 of FIG. 3.

In block 505, the system may determine a level of interest of users in the selected sub-social network. In one embodiment, the system may determine whether users in the selected sub-social network access events distributed to the sub-social network. For example, the system may determine whether users in the sub-social network view, share, and/or comment on events, e.g., content items, distributed in the sub-social network. The system may determine that those users that do access the events are properly within the selected sub-social network. The system may determine that those users that do not access the events are likely not properly within the selected sub-social network. In deciding whether a user accesses an event, the system may determine whether the user accesses the event within a predetermined amount of time of the event being made available, e.g., disseminated or distributed, through the sub-social network. If not, the system may determine that the user has not accessed the event for purposes of determining effectiveness of the sub-social network.

In one example, the system may calculate an effectiveness score based upon the number of users of the selected sub-social network that access the event and/or the number of users of the selected sub-social network that do not access the event. The effectiveness score, for example, may be a ratio of users that access the event in the selected sub-social network to the total number of users of the selected sub-social network. In one aspect, the effectiveness score may be calculated for the sub-social network as a whole. For example, the effectiveness score may be an average of effectiveness scores for events distributed through the sub-social network, for the most recent "N" events distributed through the sub-social network, where N is an integer, and/or for the events distributed in the sub-social network for a rolling period of time.

In accordance with another aspect, the system may monitor access of content items distributed to users of a sub-social network on a per user basis. The system may calculate the effectiveness scores for users as a ratio of which events distributed through the sub-social network a user has accessed compared to total events distributed through the sub-social network. The effectiveness scores for users may be determined using only the most recent "N" events distributed through the sub-social network and/or for the events distributed in the sub-social network for a rolling period of time.

In a further aspect, an effectiveness score for the sub-social network as a whole may be calculated as a combination, e.g., an average, of effectiveness scores for users that are members of the sub-social network.

In block 510, the system may modify membership in the selected sub-social group according to the effectiveness score. In one example, the system may delete a sub-social group entirely. For example, the system may delete a sub-social network responsive to determining that the effectiveness score of the sub-social network does not exceed a threshold value. In another example, the system may delete a user from a sub-social network responsive to determining that the effectiveness score for the user as a member of the sub-social network does not exceed a threshold value. The system may continually evaluate effectiveness as described herein and further continually update the sub-social networks according to effectiveness.

Figure 6:
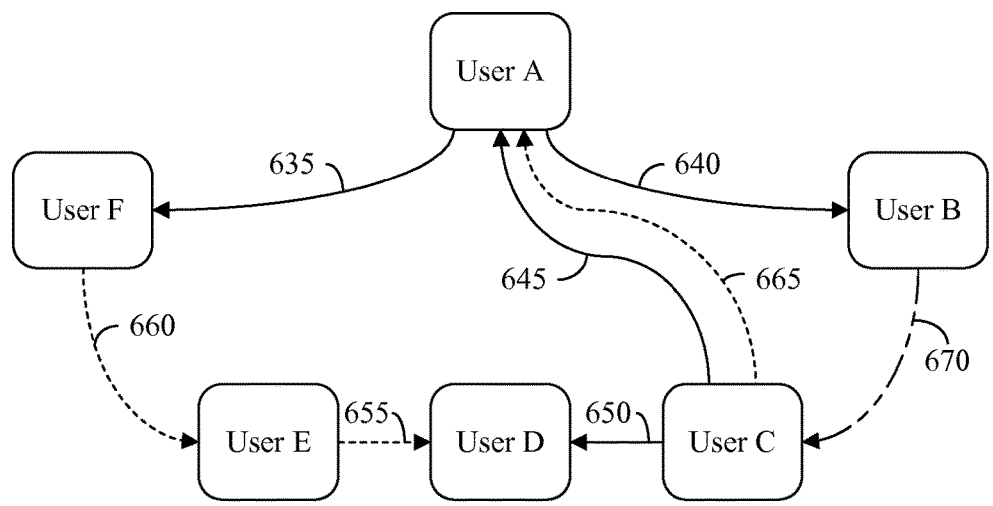
FIG. 6 is a graph illustrating an exemplary social network for a primary user.

FIG. 6 is a graph illustrating an exemplary social network for a user. As pictured, the graph includes sub-nodes representing users A, B, C, D, E, and F. The edges linking the nodes represent different social activities occurring between the users that may be classified according to interest category. In this example, solid lined edges such as edges 635, 640, 645, and 650 represent social network activity determined to be for a first interest category. Dashed lined edges such as edges 655, 660, and 670 represent social network activity determined to be for a second interest category. Edge 670 represents social network activity determined to be for a third interest category.

FIG. 6 illustrates that a different sub-social network may be formed for each of the different types of edges illustrated. For example, a first sub-social network may be formed including users A, B, C, D, and F corresponding to the first interest category. A second sub-social network may be formed of users A, C, E, and F corresponding to the second interest category. A third sub-social network may be formed of users B and C corresponding to the third interest category.

Referring to the example of FIG. 6, responsive to user A creating an event. The system may determine whether the event correlates to the first, second, or third sub-social network. The system may automatically disseminate the event to the users of the particular sub-social network determined. In another aspect, users C, D, and E may not be members of user A's social network. In that case, FIG. 6 illustrates an embodiment where the system may form the sub-social networks across social networks of users.

Figure 7:
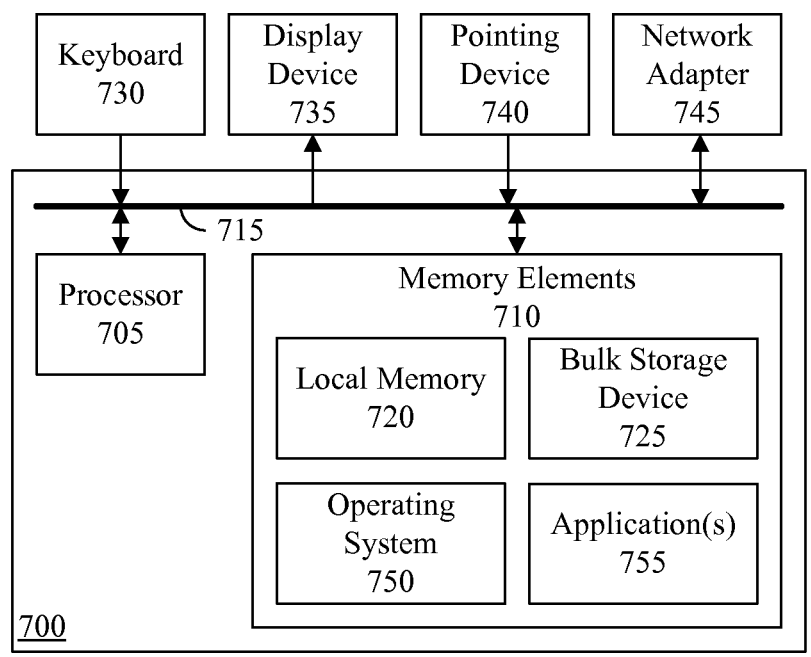
FIG. 7 is a block diagram illustrating an exemplary architecture for a data processing system.

FIG. 7 is a block diagram illustrating an exemplary architecture 700 for a data processing system. Architecture 700 may be used to implement a computer that is suitable for storing and/or executing program code. In one aspect, for example, architecture 700 may be used to implement social networking system 110 of FIG. 1.

Architecture 700 includes at least one processor 705, e.g., a central processing unit (CPU), coupled to memory elements 710 through a system bus 715 or other suitable circuitry. Architecture 700 stores program code within memory elements 710. Processor 705 executes the program code accessed from memory elements 710 via system bus 715. In one aspect, architecture 700 may be used to implement a computer or other data processing system that is suitable for storing and/or executing program code. It should be appreciated, however, that architecture 700 may be used to implement any system including a processor and memory that is capable of performing the functions described within this disclosure.

Memory elements 710 include one or more physical memory devices such as, for example, a local memory 720 and one or more bulk storage devices 725. Local memory 720 may be implemented as a random access memory (RAM) or other non-persistent memory device(s) generally used during actual execution of the program code. Bulk storage device 725 may be implemented as a hard disk drive (HDD), solid state drive (SSD), or other persistent data storage device. Architecture 700 also may include one or more cache memories (not shown) that provide temporary storage of at least some program code in order to reduce the number of times program code must be retrieved from the bulk storage device during execution.

Input/output (I/O) devices such as a keyboard 730, a display device 735, and a pointing device 740 optionally may be coupled to architecture 700. The I/O devices may be coupled to architecture 700 either directly or through intervening I/O controllers. A network adapter 745 may also be coupled to architecture 700 to enable a system implemented using architecture 700 to become coupled to other systems, computer systems, remote printers, and/or remote storage devices through intervening private or public networks. Modems, cable modems, Ethernet cards, and wireless transceivers are examples of different types of network adapter 745 that may be used with architecture 700.

Memory elements 710 store an operating system 750 and an application 755. Operating system and application 755, being implemented in the form of executable program code, are executed by architecture 700. Operating system 750 may be a server-side operating system; and, application 755 may be a server-side application that, when executed, causes the server to perform the various operations described herein. As such, operating system 750 and/or application 755 may be considered an integrated part of any system implemented using architecture 700. Application 755 and any data items used, generated, and/or operated upon by architecture 700 while executing application 755 are functional data structures that impart functionality when employed as part of architecture 700.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
analyzing, using a processor, social network activity among a plurality of users that belong to a social network;
determining, using the processor, an interest category according to the social network activity;
creating, using the processor, a sub-social network for the interest category; and
determining effectiveness of the sub-social network according to whether a user of the sub-social network accesses content items distributed through the sub-social network, wherein
the sub-social network comprises a subset of the plurality of users of the social network having an association with the interest category.

2. The method of claim 1, wherein
the social network is for a primary user.

3. The method of claim 1, further comprising:
determining that a content item from the user is related to the interest category; and
automatically distributing the content item only to the users in the sub-social network.

4. The method of claim 1, further comprising:
continually adjusting membership of the sub-social network according to the effectiveness.

5. The method of claim 1, further comprising:
removing the user of the sub-social network from the sub-social network responsive to determining that the effectiveness of the sub-social network for the user does not exceed a threshold value.

6. The method of claim 1, further comprising:
calculating a probability for the associations of users of the social network with the interest category; and
selectively including users of the social network within the sub-social network according to whether the probability exceeds a threshold value.

7. A computer hardware system, comprising:
a processor programmed to initiate executable operations comprising:
analyzing social network activity among a plurality of users that belong to a social network;
determining an interest category according to the social network activity; and
creating, using the processor, a sub-social network for the interest category
determining effectiveness of the sub-social network according to whether a user of the sub-social network accesses content items distributed through the sub-social network, wherein
the sub-social network comprises a subset of the plurality of users of the social network having an association with the interest category.

8. The system of claim 7, wherein
the social network is for a primary user.

9. The system of claim 7, wherein
the processor is further programmed to initiate executable operations comprising:
determining that a content item from the user is related to the interest category; and
automatically distributing the content item only to the users in the sub-social network.

10. The system of claim 7, wherein
the processor is further programmed to initiate executable operations comprising:
continually adjusting membership of the sub-social network according to the effectiveness.

11. The system of claim 7, wherein
the processor is further programmed to initiate executable operations comprising:
removing the user of the sub-social network from the sub-social network responsive to determining that the effectiveness of the sub-social network for the user does not exceed a threshold value.

12. The system of claim 7, wherein
the processor is further programmed to initiate executable operations comprising:
calculating a probability for the associations of users of the social network with the interest category; and
selectively including users of the social network within the sub-social network according to whether the probability exceeds a threshold value.

13. A computer program product, comprising:
a computer readable storage medium having program code stored thereon,
the program code executable by a processor to perform:
analyzing social network activity among a plurality of users that belong to a social network;
determining an interest category according to the social network activity; and
creating a sub-social network for the interest category;
determining effectiveness of the sub-social network according to whether a user of the sub-social network accesses content items distributed through the sub-social network, wherein the sub-social network comprises a subset of the plurality of users of the social network having an association with the interest category.

14. The computer program product of claim 13, wherein the social network is for a primary user.

15. The computer program product of claim 13, further comprising:

determining that a content item from the user is related to the interest category; and automatically distributing the content item only to the users in the sub-social network.

16. The computer program product of claim 13, further comprising:

continually adjusting membership of the sub-social network according to the effectiveness.

17. The computer program product of claim 13, further comprising:

removing the user of the sub-social network from the sub-social network responsive to determining that the effectiveness of the sub-social network for the user does not exceed a threshold value.

\* \* \* \* \*